(12) United States Patent
Venkadasamy et al.

(10) Patent No.: US 10,901,788 B2
(45) Date of Patent: Jan. 26, 2021

(54) FORECASTING CONTAINER-BASED RESOURCE USAGE

(71) Applicant: Microsoft Technology Licensing, LLC, Redmond, WA (US)

(72) Inventors: Ramadass Venkadasamy, San Jose, CA (US); Yuzhe He, San Jose, CA (US); Binish Ayinipulli Rathnapalan, Cupertino, CA (US); Arthur D. Dunham, Santa Clara, CA (US); Devan R. Dutta, Saratoga, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 104 days.

(21) Appl. No.: 16/204,577

(22) Filed: Nov. 29, 2018

(65) Prior Publication Data

US 2020/0174839 A1  Jun. 4, 2020

(51) Int. Cl.
*G06F 9/455* (2018.01)
*G06F 9/50* (2006.01)
*G06F 11/30* (2006.01)
*G06F 11/34* (2006.01)
*G06N 20/20* (2019.01)

(52) U.S. Cl.
CPC ........ *G06F 9/5011* (2013.01); *G06F 11/3024* (2013.01); *G06F 11/3409* (2013.01); *G06N 20/20* (2019.01)

(58) Field of Classification Search
CPC .................................................... G06F 9/5011
See application file for complete search history.

(56) References Cited

U.S. PATENT DOCUMENTS

| | | | | |
|---|---|---|---|---|
| 2012/0005449 A1* | 1/2012 | Reed | ........................ | G06F 3/067 711/171 |
| 2012/0110582 A1* | 5/2012 | Ferdous | ................ | G06F 9/5044 718/101 |
| 2013/0232480 A1* | 9/2013 | Winterfeldt | ............... | G06F 8/60 717/177 |
| 2020/0151014 A1* | 5/2020 | Sukhi | .................. | G06F 11/3442 |

* cited by examiner

*Primary Examiner* — Hang Pan
(74) *Attorney, Agent, or Firm* — Hickman Palermo Becker Bingham LLP (57) ABSTRACT

The disclosed embodiments provide a system for forecasting container-based resource usage. During operation, the system obtains time-series data containing resource allocations for applications deployed in one or more containers within a set of hosts. Next, the system applies one or more machine learning models to the time-series data to estimate a growth rate associated with use of a resource by an application. The system then determines an increase in allocation of the resource to the application that supports the estimated growth rate. Finally, the system outputs the increase in allocation for use in managing use of resources within the set of hosts.

17 Claims, 6 Drawing Sheets

FORECASTING CONTAINER-BASED RESOURCE USAGE

BACKGROUND

Field

The disclosed embodiments relate to resource management in data centers. More specifically, the disclosed embodiments relate to techniques for forecasting container-based resource usage in data centers.

Related Art

Data centers and cloud computing systems are commonly used to run applications, provide services, and/or store data for organizations or users. Within the cloud computing systems, software providers may deploy, execute, and manage applications and services using shared infrastructure resources such as servers, networking equipment, virtualization software, environmental controls, power, and/or data center space. Some or all resources may also be dynamically allocated and/or scaled to enable consumption of the resources as services. Consequently, management and use of data centers may be facilitated by mechanisms for efficiently allocating, configuring, and forecasting the use of infrastructure resources for use by applications.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for managing use of resources by applications. For example, the disclosed embodiments may be used to track the allocation and/or use of processor, memory, storage, network, input/output (I/O), and/or other physical resources in a data center by applications deployed on the resources.

More specifically, the disclosed embodiments provide a method, apparatus and system for forecasting container-based resource usage by the applications. In these embodiments, applications are deployed in containers within one or more sets of hosts. For example, a number of applications may be deployed within standalone, isolated containers in a set of hosts that form a "pool" of resources. A data center, collocation center, and/or organization may include multiple pools of resources, where each pool is isolated from other pools for security, management, collocation, compatibility, and/or other reasons.

Within a given set of hosts, each application has a set of requirements for processor cores, memory, and/or other resources. In turn, the application is allocated the corresponding amounts of required resources through the container in which the application executes. As the application grows, the application's allocations of resources in existing containers may increase. New instances of the application may also, or instead, be deployed within additional containers to process increased numbers of requests and/or otherwise scale the application.

To forecast the growth of an application with respect to use of resources, time-series data containing historical allocations of resources to the application and/or historical performance metrics for the application are obtained. Next, one or more machine learning models are applied to the time-series data to estimate the application's growth rates with respect to use of individual resources. For example, a linear regression model may be used to estimate the growth rate as the slope of a line that is fit to a time series of historical allocations of the application regarding processor, memory, and/or other physical resources.

Estimated growth rates of applications with respect to one or more resources are then used to determine increases in resource allocations to the applications that support the growth rates. For example, an application's current allocations of resources may be scaled by the corresponding growth rates to determine an increase in the number of processor cores, memory, and/or other resources required to accommodate projected growth and/or scaling of the application.

In turn, increases in resource allocations for the applications are used to determine the number of additional hosts to include in the corresponding sets of hosts. For example, a portion of the increases may be assigned to unused resources in the set of hosts, and the number of additional hosts to be added to the set may be selected to accommodate the remaining increases that exceed the capacity of the unused resources in the existing set of hosts.

By forecasting application growth and determining additional resources and/or hosts required to support the growth, the disclosed embodiments may reduce overhead and/or human error associated with conventional techniques that obtain manual estimates of application growth and corresponding resource allocations and/or additional hosts that support the growth by application owners and/or data center administrators. Consequently, the disclosed embodiments may improve the performance, accuracy, and efficiency of computer systems and/or technologies related to managing pools of resources, allocating resources to applications, and/or executing the applications using the resources.

Forecasting Container-Based Resource Usage

Figure 1:
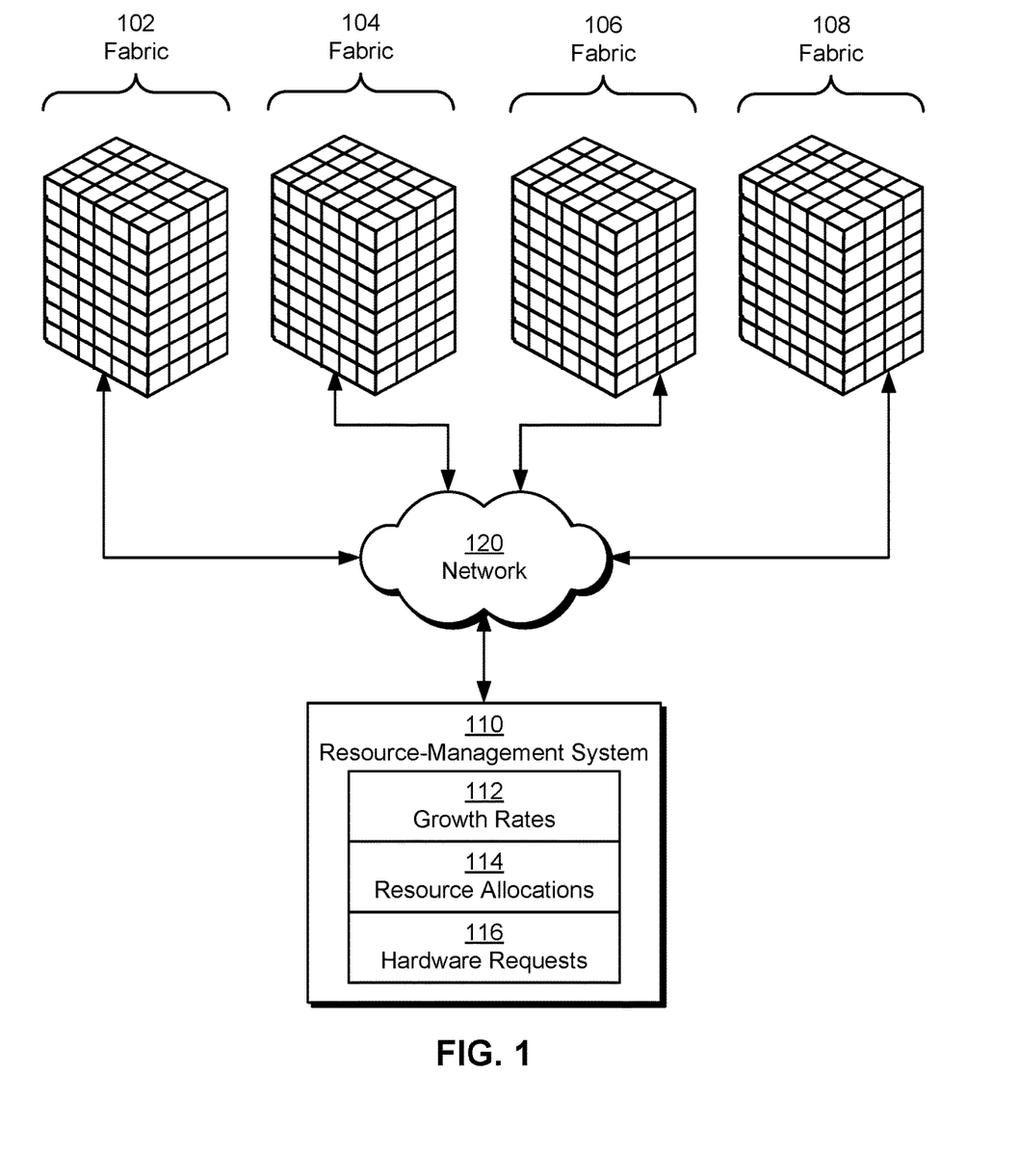
FIG. 1 shows a schematic of a system in accordance with the disclosed embodiments.

FIG. 1 shows a schematic of a system in accordance with the disclosed embodiments. As shown in FIG. 1, the system includes a resource-management system 110 that manages the deployment and use of resources in a number of fabrics 102-108. Fabrics 102-108 may be included in data centers, collocation centers, cloud computing systems, clusters, content delivery networks, and/or other collections of processing, storage, network, input/output (I/O), and/or other resources. Resources in and across fabrics 102-108 may be connected to one another over a network 120 such as a local area network (LAN), wide area network (WAN), personal area network (PAN), virtual private network, intranet, mobile phone network (e.g., a cellular network), WiFi network, Bluetooth network, universal serial bus (USB) network, Ethernet network, and/or switch fabric. The resources may include processors, memory, storage, network, I/O, and/or other types of hardware provided by data center and/or computing fabrics 102-108.

More specifically, resource-management system 110 includes functionality to estimate growth rates 112 associated with use of resources by applications executing within containers in fabrics 102-108. For example, resource-management system 110 may forecast growth rates 112 based on trends in historical resource allocations 114 to the applications (e.g., allocations of processor cores, memory, network, I/O, and/or other resources to each application instance).

Resource-management system 110 additionally includes functionality to generate and/or issue hardware requests 116 based on growth rates 112 and/or resource allocations 114. As described in further detail below, resource-management system 110 determines increases in allocations of resources to applications that support the applications' estimated growth rates 112, as well as additional hosts to be procured and/or provisioned to support the increases in allocations. Resource-management system 110 then creates hardware requests 116 for the additional hosts to allow resources in fabrics 102-108 to continue to support growth and/or scaling of the applications.

Figure 2:
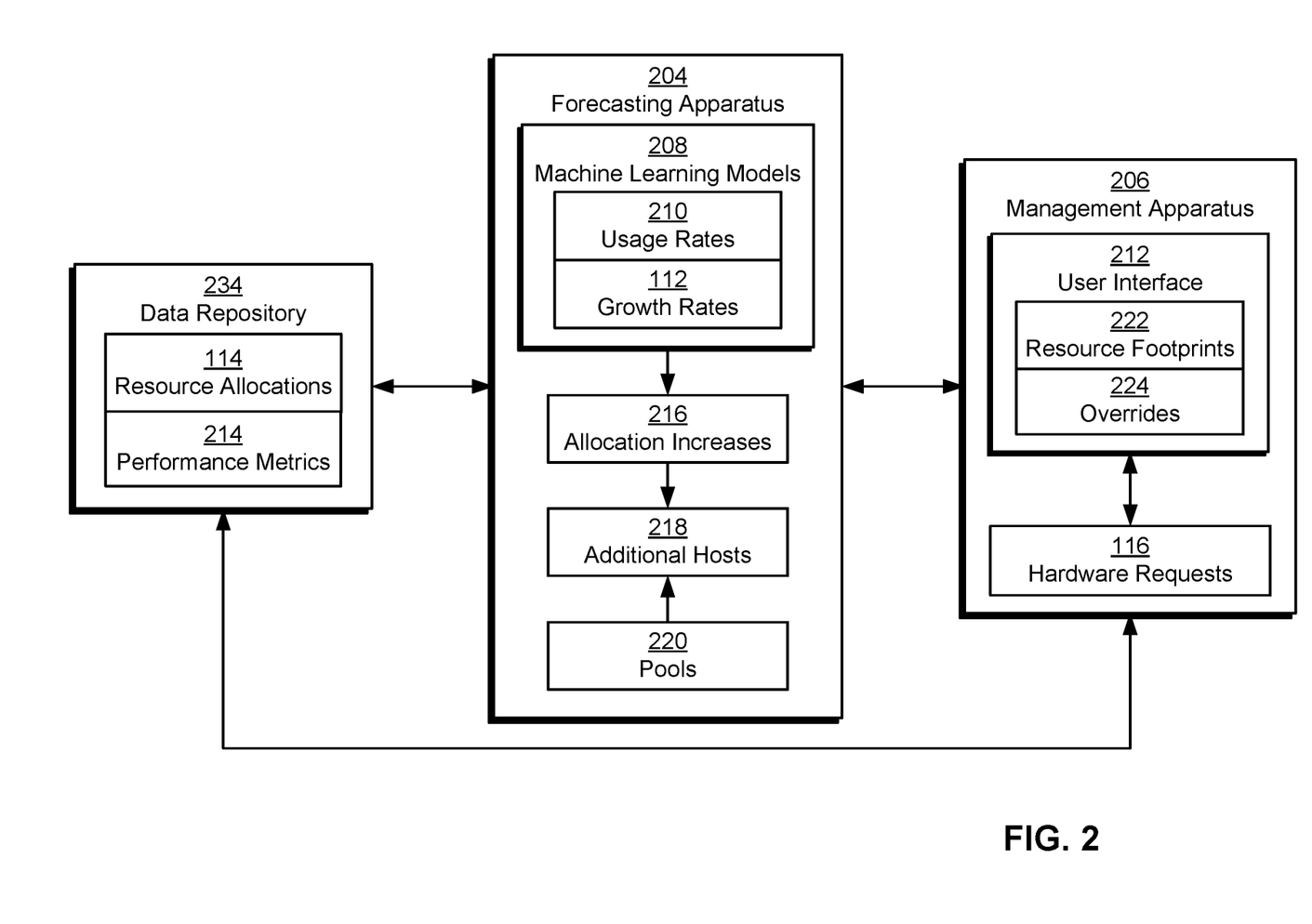
FIG. 2 shows a system for managing resource usage by applications in accordance with the disclosed embodiments.

FIG. 2 shows a system for managing resource usage (e.g., resource-management system 110 of FIG. 1) by applications in accordance with the disclosed embodiments. As shown in FIG. 2, the system includes a forecasting apparatus 204 and a management apparatus 206. Each of these components is described in further detail below.

Forecasting apparatus 204 uses one or more machine learning models 208 to estimate usage rates 210 and/or growth rates 112 associated with one or more applications deployed on a set of hosts. Usage rates 210 may reflect usage of the applications, and growth rates 112 may reflect use of resources by the applications.

In one or more embodiments, usage rates 210 are based on performance metrics 214 related to usage and/or performance of the applications. For example, performance metrics 214 may include, for each application, a queries per second (QPS) count, error rate, latency, storage utilization, network utilization, thread pool utilization, processor utilization, and/or memory utilization over a given period (e.g., a second, minute, hour, day, etc.). If multiple values of a performance metric are collected over the period (e.g., multiple QPS values over a minute), the values may be aggregated (e.g., averaged, summed, etc.) into a single value that is representative of the period.

In one or more embodiments, growth rates 112 are based on resource allocations 114 that specify allocations of various types of resources to applications. For example, resource allocations 114 may specify, for each application, the number of processor cores, amount of memory, amount of storage, number of I/O interfaces, and/or number of instances of the application used on a given day.

To determine usage rates 210 and growth rates 112, forecasting apparatus 204 obtains historical resource allocations 114 and/or performance metrics 214 for the applications from a data repository 234. For example, forecasting apparatus 204 may obtain resource allocations 114 and/or performance metrics 214 as time-series data that spans a predefined period (e.g., the last week, month, three months, etc.) from a relational database, data warehouse, filesystem, event stream, flat file, and/or another data store providing data repository 234.

In one or more embodiments, applications are deployed in containers within each set of hosts. For example, a number of applications may be deployed within standalone, isolated containers in a set of hosts that form a pool of resources. Each container may provide operating-system-level virtualization and/or other types of virtualization that allocates a portion of resources in a host to the application executing within the container. In turn, resources in each host may be shared by multiple containerized applications from different teams instead of allocating individual hosts to individual teams and/or applications.

In one or more embodiments, each set of hosts in which applications are deployed forms a "pool" (e.g., pools 220) of resources that is isolated from other hosts and/or resources in the same fabric (e.g., fabrics 102-108 of FIG. 1). For example, a fabric in a data center, collocation center, cluster, and/or other collection of resources may include a "general" pool of resources that can be allocated to any application, as well as one or more "private" pools 220 that are accessible to a limited number of applications for security, management, collocation, compatibility, and/or other reasons.

Because pools 220 of resources are managed and used separately from one another, usage rates 210 and/or growth rates 112 may be estimated with respect to individual pools 220 of resources instead of across pools 220 of resources. For example, an application that is deployed in two or more pools 220 of resources may have a different set of values for usage rates 210 and/or growth rates 112 for each pool in which the application is deployed.

As shown in FIG. 2, forecasting apparatus 204 uses machine learning models 208 to predict and/or estimate usage rates 210 and growth rates 112. Machine learning models 208 are applied to performance metrics 214 for an application to estimate usage rates 210 for the application, while machine learning models 208 are applied to resource allocations 114 for the application to estimate growth rates 112 of the application with respect to the corresponding resources.

For example, machine learning models 208 may include a separate linear regression model that is fit to each time series associated with resource allocations 114 and/or performance metrics 214. As a result, usage rates 210 may be determined based on the slopes of the regression models fit to one or more time series of performance metrics 214, and growth rates 112 may be determined based on the slopes of the regression models fit to one or more time series of resource allocations 114. In other words, usage rates 210 and growth rates 112 may reflect trend components of time-series data containing resource allocations 114 and performance metrics 214.

When a regression model includes a positive slope for a time series of a resource allocation and/or performance metric for an application, an increase in the corresponding growth rate and/or usage rate of the application may be found. When the regression model identifies a non-positive slope for the time series, the application may lack an increase in the corresponding growth rate and/or usage rate.

Use of linear regression models to estimate usage rates and/or growth rates associated with applications is described in further detail below with respect to FIG. 3.

Forecasting apparatus 204 uses output of machine learning models 208 to calculate allocation increases 216 in resource allocations 114 that support increases in usage rates 210 and/or growth rates 112 in the corresponding applications. In particular, forecasting apparatus 204 obtains current allocations of different types of resources (e.g., processor cores, memory, storage, I/O, network, etc.) to an application as the latest resource allocations 114 for the application and uses usage rates 210 and/or growth rates 112 for the application to "project" the current allocations into future allocation increases 216 of the resources to the application. Allocation increases 216 may additionally be determined for one or more forecast periods representing future periods over which allocation increases 216 are to be made.

Continuing with the above example, when performance metrics 214 are collected for a given application, forecasting apparatus 204 may use regression models that are fit to performance metrics 214 to verify that usage rates 210 for the application are increasing over time. If usage rates 210 for the application are not increasing over time, forecasting apparatus 204 may set growth rates 112 to a non-positive amount (e.g., 0). When performance metrics 214 are not collected for an application (e.g., when the application lacks QPS counts) or have not been collected for a minimum period (e.g., a number of days, a week, etc.), forecasting apparatus 204 may omit estimation of usage rates 210 for the application.

After usage rates 210 for an application are verified to increase over time and/or when usage rates 210 for the application cannot be calculated, forecasting apparatus 204 may use slopes of regression models that are fit to resource allocations 114 to determine growth rates 112 for use of resources by the application. When resource allocations 114 fail to span a minimum period (e.g., a number of days, a week, etc.), forecasting apparatus 204 may omit estimation of growth rates 112 and subsequent calculation of allocation increases 216 for the application. When slopes of regression models that are fit to resource allocations 114 indicate that growth rates 112 for use of resources by an application are not increasing, forecasting apparatus 204 may set growth rates 112 to a non-positive number (e.g., 0) and omit calculation of allocation increases 216 for the application.

When forecasting apparatus 204 identifies increases in growth rates 112 over time, forecasting apparatus 204 may calculate an allocation increase for each resource used by the application as the product of the current allocation of the resource to the application and the growth rate of the application with respect to the resource. For example, an application that is currently allocated 20 processor cores and has an estimated growth rate of 1.2 for processor resources over the previous three months may have an increased allocation of 20*1.2, or 24, processor cores over a forecast period spanning the next three months. Similarly, an application that currently has 5 running instances and an estimated growth rate of 1.4 for application instances over the previous three months may have an increased allocation of 5*1.4, or 7, application instances over the same forecast period.

Because each instance of the application is associated with a minimum set of "required" resources (e.g., a minimum number of processor cores, a minimum amount of memory, etc.), allocation increases 216 in application instances may be associated with further allocation increases 216 in resources required by the application instances. As a result, the total allocation increases 216 in resource allocations 114 for the application may be obtained by combining allocation increases 216 of resources for existing instances of the application with allocation increases 216 of the resources for new instances of the application. For example, an application may have projected allocation increases 216 of four processor cores for existing instances and two new application instances over the next three months. If the application requires a minimum of four processor cores per application instance, the application may have a total allocation increase of 12 processor cores (i.e., four processor cores for existing application instances and eight processor cores for new application instances) over the next three months.

Forecasting apparatus 204 uses allocation increases 216 for all applications deployed in a given pool of resources to determine the number of additional hosts 218 to be added to the pool to support allocation increases 216. For example, forecasting apparatus 204 may execute a series of simulations that assign a portion of allocation increases 216 in the pool to existing hosts in the pool. The simulations may also determine the number of additional hosts 218 required to accommodate a remainder of allocation increases 216 that could not be assigned to existing hosts and/or resources in the pool. Forecasting apparatus 204 may select, from the distribution of numbers of additional hosts 218 outputted by the simulations, a number of additional hosts 218 that reflects a median, percentile, and/or another position in the distribution and store the selected number of additional hosts 218 along with allocation increases 216 for the pool in data repository 234. Forecasting apparatus 204 may also, or instead, transmit the selected number of additional hosts 218 and/or allocation increases 216 to management apparatus 206.

Management apparatus 206 uses usage rates 210, growth rates 112, allocation increases 216, additional hosts 218, and/or other output of forecasting apparatus 204 to manage the allocation and/or provisioning of resources in pools 220. First, management apparatus 206 provides a user interface 212 that allows users to view resource footprints 222 associated with applications deployed in pools 220. For example, management apparatus 206 may display, within a graphical user interface (GUI), command line interface (CLI), web-based user interface, and/or other type of user interface 212, resource footprints 222 as lists, tables, charts, visualizations, and/or other representations of resource allocations 114 over time for each application deployed in a given pool of resources.

Management apparatus 206 also provides functionality to obtain overrides 224 to growth rates 112, allocation increases 216, and/or additional hosts 218 from users interacting with user interface 212. For example, management apparatus 206 may display, within user interface 212, estimates of growth rates 112, allocation increases 216, and/or additional hosts 218 from forecasting apparatus 204 to owners of the corresponding applications and/or administrators of pools 220. The owners and/or administrators may interact with user interface 212 to adjust growth rates 112, allocation increases 216, and/or additional hosts 218 for individual applications based on projected application growth (or lack of growth) that is not reflected in resource allocations 114 and/or performance metrics 214 (e.g., plans to integrate an application with a much larger application or product in the near future).

Management apparatus 206 may also show, within user interface 212, costs associated with resource footprints 222, growth rates 112, allocation increases 216, and/or additional hosts 218. For example, management apparatus 206 may display historical and existing costs paid by customers for use of cloud computing and/or cloud storage resources by applications owned by the customers. Management apparatus 206 may also, or instead, display increases in the costs that are associated with projected growth rates 112 of the applications, allocation increases 216, and/or additional hosts 218. The customers may use overrides 224 to adjust the costs associated with subsequent resource use by the applications, in lieu of or in addition to using overrides 224 to reflect the customers' expectations of the applications' growth (or lack of growth).

Management apparatus 206 further creates and/or issues hardware requests 116 based on additional hosts 218 and/or overrides 224. For example, management apparatus 206 may generate, for each application deployed in a given pool of resources, a request for the number of additional hosts 218 determined by forecasting apparatus 204 and/or specified in an override obtained through user interface 212. Management apparatus 206 may transmit the request to an inventory system for managing and/or sourcing hardware resources in pools 220, and one or more entities associated with the inventory system may fulfill the request (e.g., by procuring and deploying the requested number of additional hosts 218 in the pool). In turn, pools 220 may accommodate increased consumption of resources by applications and/or new application instances deployed in pools 220 over the forecast period associated with growth rates 112, allocation increases 216, and/or additional hosts 218.

By forecasting application growth and determining additional resources and/or hosts required to support the growth, the system of FIG. 2 may reduce overhead and/or human error associated with conventional techniques that obtain manual estimates of application growth and corresponding resource allocations and/or additional hosts that support the growth by application owners and/or data center administrators. Consequently, the system may improve the performance, accuracy, and efficiency of computer systems and/or technologies related to managing pools of resources, allocating resources to applications, and/or executing the applications on the resources.

Those skilled in the art will appreciate that the system of FIG. 2 may be implemented in a variety of ways. First, forecasting apparatus 204, management apparatus 206, and data repository 234 may be provided by a single physical machine, multiple computer systems, one or more virtual machines, a grid, one or more databases, one or more filesystems, and/or a cloud computing system. Forecasting apparatus 204 and management apparatus 206 may additionally be implemented together and/or separately by one or more hardware and/or software components and/or layers. For example, forecasting apparatus 204 may include one or more backend components that project resource allocations 114 and performance metrics 214 into estimates of usage rates 210, growth rates 112, allocation increases 216, and/or additional hosts 218 in pools 220. In turn, management apparatus 206 may include one or more frontend and/or backend components that output projections from forecasting apparatus 204 to users, obtain overrides 224 to the projections from users, and generate hardware requests 116 based on the projections and/or overrides 224.

Second, a number of techniques may be used to estimate usage rates 210, growth rates 112, allocation increases 216, and/or additional hosts 218. For example, the functionality of machine learning models 208 and/or forecasting apparatus 204 may be provided by artificial neural networks, support vector machines, decision trees, Bayesian models, Kalman filters, state-space models, deep learning models, hierarchical models, and/or ensemble models. The retraining or execution of each machine learning model may be performed on an offline, online, and/or on-demand basis to accommodate requirements or limitations associated with the processing, performance, or scalability of the system and/or the availability of features used to train the machine learning model. Multiple versions of a machine learning model may be adapted to different applications, resources, or pools 220, or the same machine learning model may be used to predict usage rates 210, growth rates 112, allocation increase 216, and/or additional hosts 218 for all applications, resources, and/or pools 220.

Figure 3:
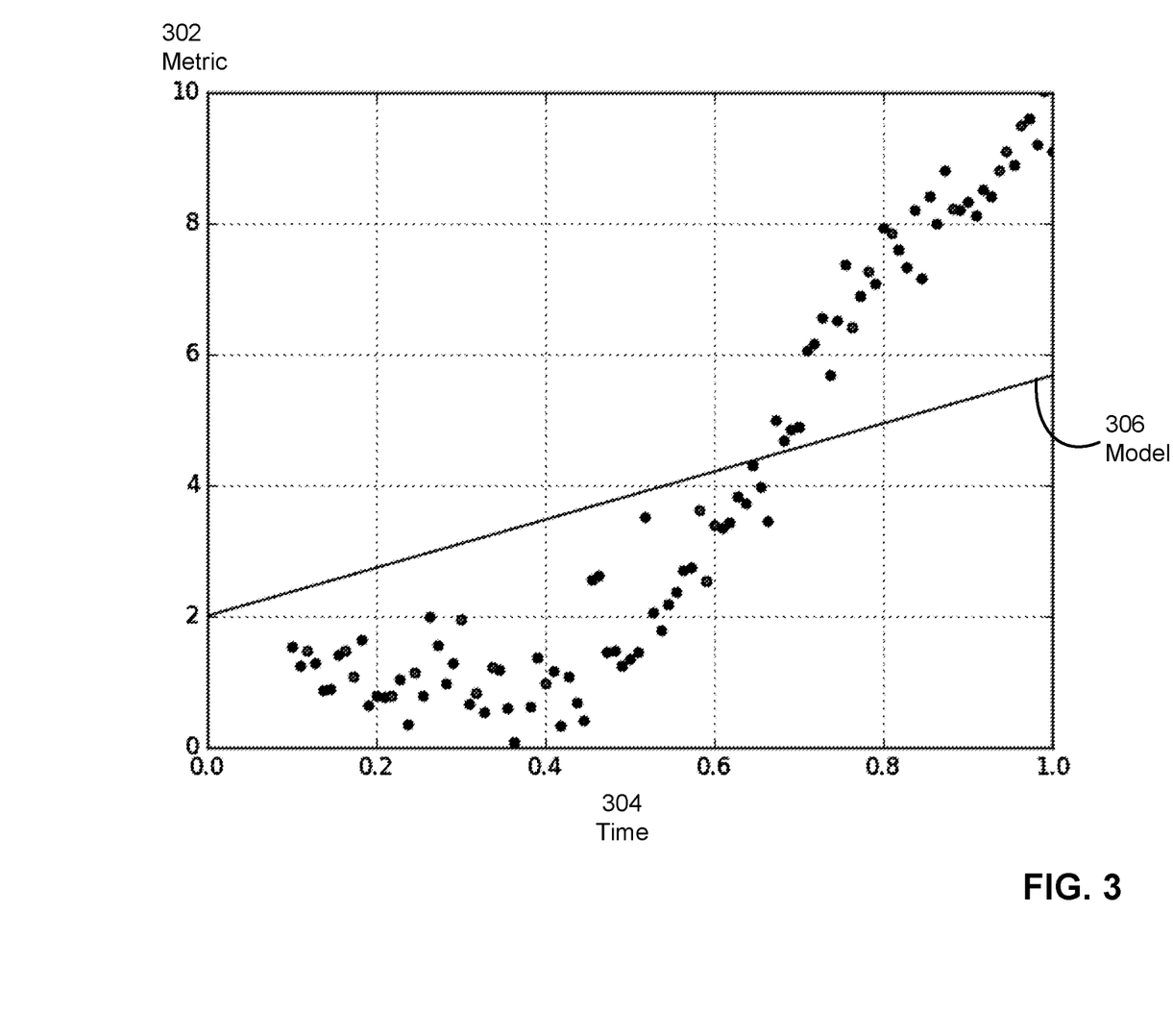
FIG. 3 shows an example plot in accordance with the disclosed embodiments.

FIG. 3 shows an example plot in accordance with the disclosed embodiments. More specifically, FIG. 3 shows a plot of a metric 302 over time 304. Metric 302 may include a resource allocation, such as a daily allocation of a type of resource (e.g., processor, memory, storage, network, I/O, etc.) to an application. Alternatively, metric 302 may include a performance metric such as QPS, error rate, latency, storage utilization, network utilization, processor utilization, thread pool utilization, and/or memory utilization.

In general, metric 302 may be represented as a time series that spans a certain length of time 304. As shown in FIG. 3, units of time 304 in the plot span values ranging 0.0 to 1.0, with 0.0 representing the beginning of a period over which metric 302 is collected and/or analyzed (e.g., the beginning of a quarter) and 1.0 representing the end of the period (e.g., the end of the quarter).

A model 306 is applied to values of metric 302 over time 304 to estimate a rate of change (e.g., growth rate, usage rate, etc.) associated with metric 302. For example, model 306 may be a linear regression model that is fit to the time series of metric 302. As a result, the rate of change associated with metric 302 may be obtained as the slope of the line represented by the linear regression model. In turn, the slope of the line may be used to "project" the rate of change into a future value for the resource allocation and/or performance metric, as discussed above.

Figure 4:
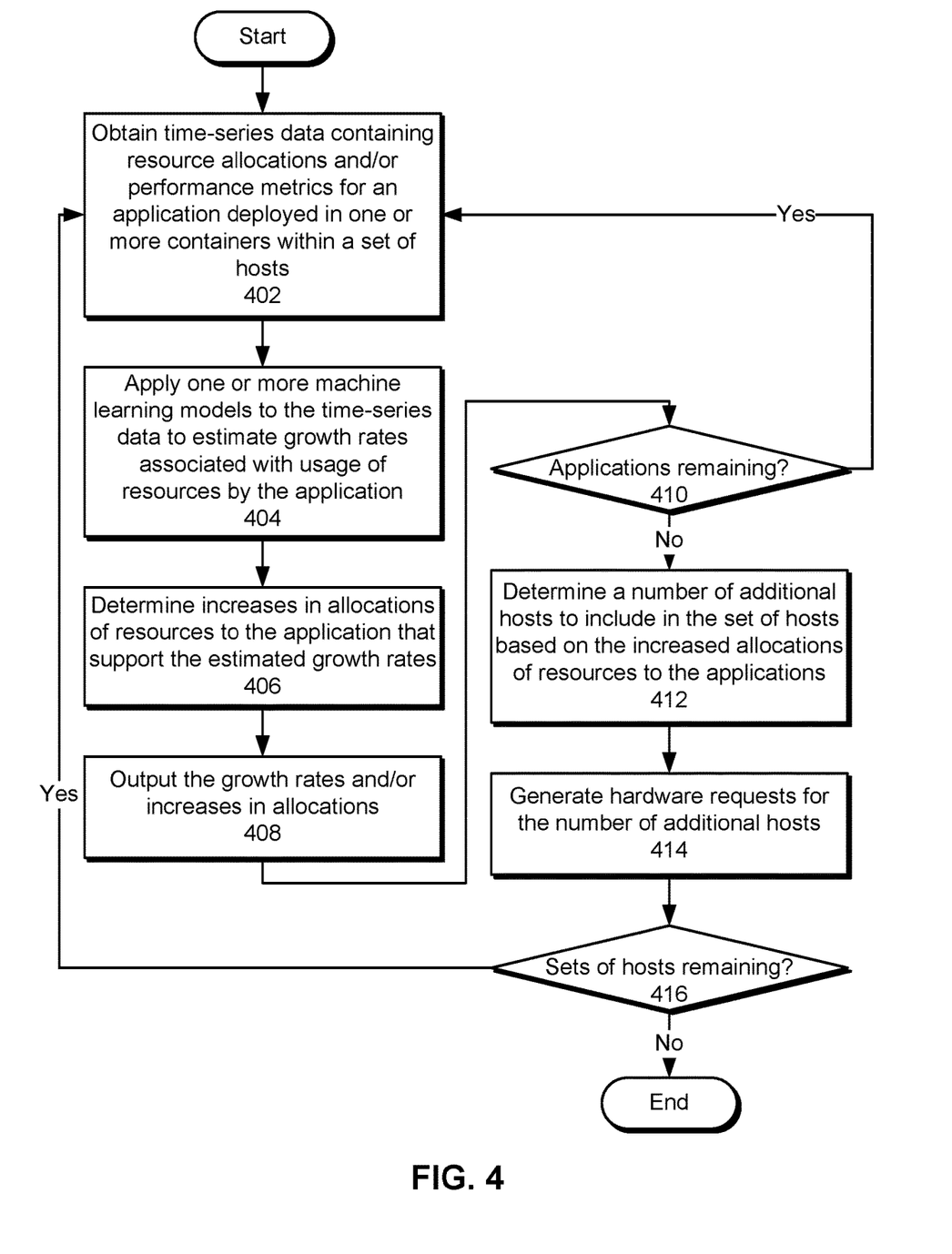
FIG. 4 shows a flowchart illustrating a process of forecasting container-based resource usage in accordance with the disclosed embodiments.

FIG. 4 shows a flowchart illustrating a process of forecasting container-based resource usage in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, time-series data containing resource allocations and/or performance metrics for an application deployed in one or more containers within a set of hosts is obtained (operation 402). For example, the time-series data may include allocations of resources such as processor, memory, network, I/O, and/or application instances to the application. The time-series data may also, or instead, include performance metrics such as QPS counts, error rates, latencies, storage utilizations, network utilizations, thread pool utilizations, processor utilizations, and/or memory utilizations.

Next, one or more machine learning models are applied to the time-series data to estimate growth rates associated with usage of resources by the application (operation 404). For example, the machine learning model(s) may include regression models that are fit to the time-series data to estimate the growth rates as trend components in the time-series data. Increases in allocations of resources to the application that support the estimated growth rates are also determined (operation 406), and the growth rates and/or increases in allocations are outputted (operation 408), as described in further detail below with respect to FIG. 5.

Operations 402-408 may be repeated for remaining applications (operation 410) in the set of hosts. For example, growth rates and increases in allocation of resources may be determined for all applications deployed within a pool of resources represented by the set of hosts.

After growth rates and increases in allocations of resources are determine for all applications deployed in the set of hosts, a number of additional hosts to include in the set of hosts is determined based on the increased allocations of resources to the applications (operation 412). For example, a series of simulations (e.g., 1000 simulations) may be performed to assign a portion of the increases in resource allocations to existing hosts in the set of hosts and determine the number of additional hosts required to accommodate the remainder of the increases in resource allocations. The distribution of numbers of additional hosts outputted by the simulations may then be used to select a value representing a median, percentile, and/or another position in the distribution as the number of hosts to be added to the set of hosts.

Finally, hardware requests for the selected number of additional hosts are generated (operation 414). For example, one or more requests for the selected number of additional hosts to be added to the set of hosts may be transmitted to an inventory system for subsequent processing and fulfillment.

Operations 402-414 may further be repeated for remaining sets of hosts (operation 416) for which container-based resource usage is to be forecasted. For example, growth rates, increases in allocations of resources, and numbers of additional hosts required to accommodate the increases in allocations of resources may be determined for all applications and/or pools of resources associated with a data center, collocation center, cloud computing system, organization, and/or another entity.

Figure 5:
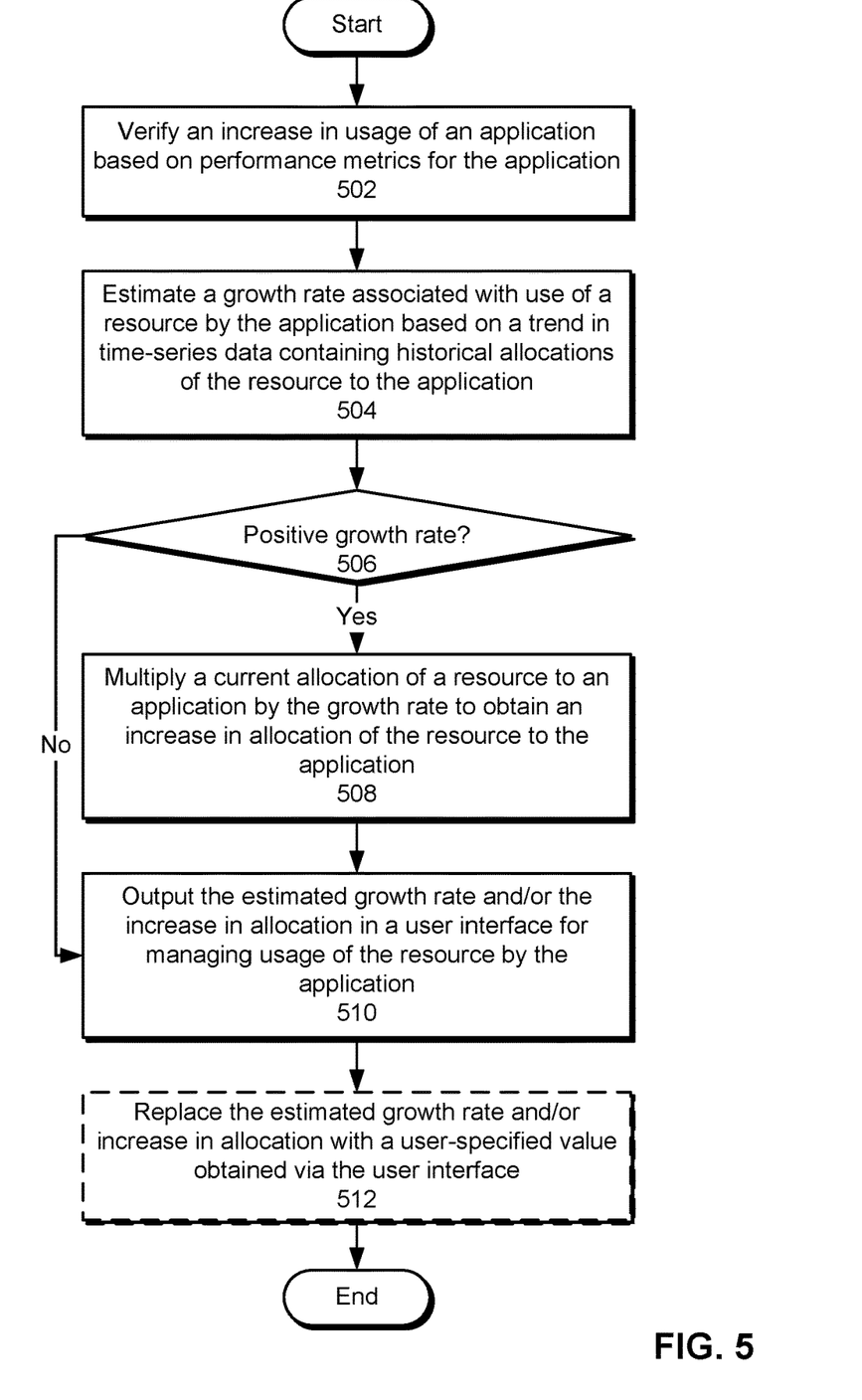
FIG. 5 shows a flowchart illustrating a process of determining additional resource allocations to support estimated growth rates of applications in accordance with the disclosed embodiments.

FIG. 5 shows a flowchart illustrating a process of determining additional resource allocations to support estimated growth rates of applications in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

First, an increase in usage of the application is verified based on performance metrics for an application (operation 502). For example, a regression model may be fit to QPS counts for the application to verify that the QPS counts are increasing over time. Operation 502 may be skipped if the application lacks performance metrics and/or performance metrics for the application have not been collected for at least a minimum period (e.g., one week).

Next, a growth rate associated with usage of a resource is estimated based on a trend in time-series data containing historical allocations of the resource to the application (operation 504), as discussed above. If the time-series data is missing or does not span a minimum period, the growth rate may be set to 0 and/or another non-positive number.

Additional processing may then be performed based on a positive or non-positive growth rate (operation 506). If the growth rate is positive, a current allocation of a resource to an application is multiplied by the growth rate to obtain an increase in allocation of the resource to the application (operation 508). For example, a current allocation of 10 GB of memory to the application may be multiplied by an estimated 1.1× growth rate over the next three months to obtain an increased allocation of 11 GB of memory to the application over the same three-month period. If the growth rate is not positive, calculation of the increase in allocation of the resource to the application is skipped.

The estimated growth rate and/or increase in allocation are outputted in a user interface (operation 510). For example, the growth rate, current resource allocation, historical resource allocations, and/or any corresponding increase in allocation of the resource to the application may be displayed to an owner of the application to allow the owner to assess the application's resource "footprint" and/or review the estimated growth rate and/or increases in allocations. Costs (e.g., costs paid by a customer for use of a cloud computing and/or cloud storage system) associated with the growth rate, current and/or historical resource allocations, and/or increase in allocation may also be displayed in the user interface. The owner may interact with the user interface to override the growth rate and/or increase in allocation to adjust the corresponding costs (e.g., to lower projected costs associated with the application) and/or to reflect non-organic growth or changes in the application.

The estimated growth rate and/or increase in allocation may optionally be replaced with a user-specified value obtained via the user interface (operation 512). Continuing with the above example, the application's owner may replace the growth rate and/or increase in allocation with a different value to account for "nonorganic" growth of the application (e.g., as a result of integrations, announcements, and/or other product changes).

Figure 6:
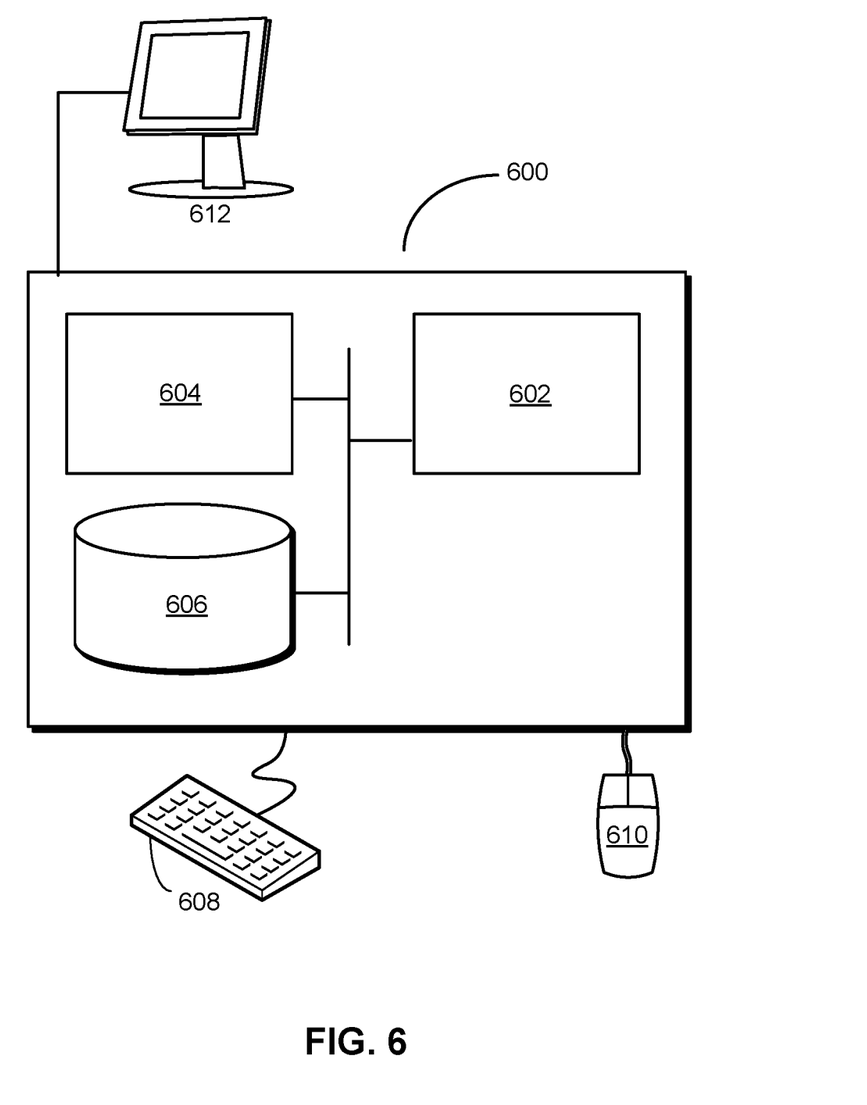
FIG. 6 shows a computer system in accordance with the disclosed embodiments.

FIG. 6 shows a computer system 600 in accordance with the disclosed embodiments. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for forecasting container-based resource usage. The system includes a forecasting apparatus and a management apparatus, one or more of which may alternatively be termed or implemented as a module, mechanism, or other type of system component. The forecasting apparatus obtains time-series data containing resource allocations for applications deployed in one or more containers within a set of hosts. Next, the forecasting apparatus applies one or more machine learning models to the time-series data to estimate a growth rate associated with use of a resource by an application. The forecasting apparatus then determines an increase in allocation of the resource to the application that supports the estimated growth rate. Finally, the management apparatus outputs the increase in allocation for use in managing use of resources within the set of hosts.

In addition, one or more components of computer system 600 may be remotely located and connected to the other components over a network. Portions of the present embodiments (e.g., forecasting apparatus, management apparatus, data repository, fabrics, etc.) may also be located on different nodes of a distributed system that implements the embodiments. For example, the present embodiments may be implemented using a cloud computing system that forecasts and/or manages container-based resource usage by applications executing on one or more remote pools of resources.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
obtaining time-series data comprising resource allocations and performance metrics for a plurality of applications deployed in one or more containers within a set of hosts;
applying, by a computer system, one or more machine learning models to the time-series data to estimate a growth rate associated with use of a resource by a first application in the plurality of applications;
causing the growth rate to be presented in a user interface;
receiving, through the user interface, user input that represents an adjustment to the growth rate;
determining, by the computer system, a first increase in allocation of the resource to the first application that supports an estimated growth rate that is based on the adjustment to the growth rate;
determining a second increase in allocation of the resource to a second application, in the plurality of applications, deployed in the set of hosts, wherein the second application is different than the first application;
determining a number of additional hosts to include in the set of hosts based on the first increase and the second increase;

wherein determining the number of the additional hosts to include in the set of hosts comprises:
assigning a portion of the first and second increases in allocations of the resource to existing hosts in the set of hosts; and
determining the number of the additional hosts required to accommodate a remainder of the first and second increases in allocations of the resource; and
outputting the first and second increases in allocation for use in managing use of resources within the set of hosts.

2. The method of claim 1, wherein the user input is received from an owner of the first application.

3. The method of claim 1, wherein determining the first increase in the allocation of the resource to the first application that supports the estimated growth rate comprises:
multiplying a current allocation of the resource to the first application by the estimated growth rate to obtain the first increase in the allocation of the resource to the first application.

4. The method of claim 1, wherein applying the one or more machine learning models to the time-series data to estimate the growth rate associated with usage of the resource by the first application comprises:
estimating the growth rate based on a trend in the time-series data.

5. The method of claim 4, wherein applying the one or more machine learning models to the time-series data to estimate the growth rate associated with usage of the resource by the first application further comprises:
verifying, based on the performance metrics, an increase in usage of the first application prior to estimating the growth rate.

6. The method of claim 1, wherein outputting the first and second increases in the allocations for use in managing use of the resources within the set of hosts comprises:
outputting the estimated growth rate, the first and second increases in allocations, and a cost associated with the first and second increases in allocations in a user interface for managing use of the resource by the first and second applications.

7. The method of claim 1, wherein the resource comprises at least one of:
a processing resource;
a memory resource;
a storage resource;
an input/output (I/O) resource; or
an instance of the first application.

8. The method of claim 1, wherein the performance metrics comprise at least one of:
a queries per second (QPS);
an error rate;
a latency;
a storage utilization;
a network utilization;
a thread pool utilization;
a processor utilization; or
a memory utilization.

9. A system, comprising:
one or more processors; and
memory storing instructions that, when executed by the one or more processors, cause the system to:
obtain time-series data comprising resource allocations for a plurality of applications deployed in one or more containers within a set of hosts;
apply one or more machine learning models to the time-series data to estimate a growth rate associated with use of a resource by a first application, in the plurality of applications, over a period;
cause the growth rate to be presented in a user interface;
receiving, through the user interface, user input that represents an adjustment to the growth rate;
determine a first increase in allocation of the resource to the first application that supports an estimated growth rate that is based on the adjustment to the growth rate;
determine a second increase in allocation of the resource to a second application, in the plurality of applications, deployed in the set of hosts, wherein the second application is different than the first application;
determine a number of the additional hosts to include in the set of hosts based on the first increase and the second increase;
wherein determining the number of the additional hosts to include in the set of hosts comprises:
assigning a portion of the first and second increases in allocations of the resource to existing hosts in the set of hosts; and
determining the number of the additional hosts required to accommodate a remainder of the first and second increases in allocations of the resource; and
output the first and second increases in allocation for use in managing use of resources within the set of hosts.

10. The system of claim 9, wherein determining the first increase in the allocation of the resource to the first application that supports the estimated growth rate comprises:
multiplying a current allocation of the resource to the first application by the estimated growth rate over the period to obtain the first increase in the allocation of the resource to the first application.

11. The system of claim 9, wherein applying the one or more machine learning models to the time-series data to estimate the growth rate associated with usage of the resource by the first application over the period comprises:
verifying, based on performance metrics in the time-series data, an increase in usage of the first application; and
estimating the growth rate based on a trend in the time-series data.

12. The system of claim 11, wherein the performance metrics comprise at least one of:
a queries per second (QPS);
an error rate;
a latency;
a thread pool utilization;
a storage utilization;
a network utilization;
a processor utilization; or
a memory utilization.

13. The system of claim 9, wherein the resource comprises at least one of:

a processing resource;
a memory resource;
a storage resource;
an input/output (I/O) resource; or
an instance of the first application.

14. The system of claim 9, wherein outputting the increase in the allocation for use in managing use of the resources within the set of hosts comprises:
outputting the estimated growth rate, the first and second increases in allocation, and a cost associated with the increase in allocation in a user interface for managing use of the resource by the first application.

15. The system of claim 9, wherein the user input is received from an owner of the first application.

16. A non-transitory computer-readable storage medium storing instructions that when executed by a computer cause the computer to perform a method, the method comprising:
obtaining time-series data comprising resource allocations and performance metrics for a plurality of applications deployed in one or more containers within a set of hosts;
applying one or more machine learning models to the time-series data to estimate a growth rate associated with use of a resource by a first application over a period;
causing the growth rate to be presented in a user interface;
receiving, through the user interface, user input that represents an adjustment to the growth rate;
determining a first increase in allocation of the resource to the first application that supports an estimated growth rate that is based on the adjustment to the growth rate;
determining a second in allocation of the resource to a second application, in the plurality of applications, deployed in the set of hosts, wherein the second application is different than the first application;
determining a number of additional hosts to include in the set of hosts based on the first and second increases in allocations of the resource;
wherein determining the number of the additional hosts to include in the set of hosts comprises:
assigning a portion of the first and second increases in allocations of the resource to existing hosts in the set of hosts; and
determining the number of the additional hosts required to accommodate a remainder of the first and second increases in allocations of the resource; and
outputting, in a user interface for managing use of the resource by the first and second applications, the first and second increases in allocations and a cost associated with the first and second increases in allocations of the resource.

17. The non-transitory computer-readable storage medium of claim 16, the method further comprising:
issuing a hardware request for the number of additional hosts.

* * * * *